United States Patent
McCoy et al.

(10) Patent No.: US 9,569,440 B2
(45) Date of Patent: Feb. 14, 2017

(54) METHOD AND APPARATUS FOR CONTENT MANIPULATION

(71) Applicants: Sony Corporation, Tokyo (JP); Sony Network Entertainment International LLC, Los Angeles, CA (US)

(72) Inventors: Charles McCoy, Coronado, CA (US); True Xiong, San Diego, CA (US); Jason Wallace, Encinitas, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 141 days.

(21) Appl. No.: 13/773,858

(22) Filed: Feb. 22, 2013

(65) Prior Publication Data
US 2014/0244640 A1    Aug. 28, 2014

(51) Int. Cl.
G06F 17/30    (2006.01)

(52) U.S. Cl.
CPC ............... G06F 17/30038 (2013.01)

(58) Field of Classification Search
CPC ............ G06F 17/3071; G06F 17/30864; G06F 17/30598
USPC ........................ 707/737, 754, 752
See application file for complete search history.

(56) References Cited

U.S. PATENT DOCUMENTS

| | | | |
|---|---|---|---|
| 6,321,158 B1* | 11/2001 | DeLorme et al. | 701/426 |
| 2002/0016786 A1 | 2/2002 | Pitkow et al. | |
| 2003/0151674 A1* | 8/2003 | Lin | 348/222.1 |
| 2005/0105775 A1* | 5/2005 | Luo et al. | 382/115 |
| 2005/0289179 A1* | 12/2005 | Naphade | G06K 9/6292 |
| 2007/0288408 A1* | 12/2007 | Li | G06F 9/50 706/19 |
| 2009/0077124 A1* | 3/2009 | Spivack et al. | 707/103 Y |
| 2009/0204475 A1 | 8/2009 | Cohen et al. | |
| 2009/0204885 A1* | 8/2009 | Ellsworth et al. | 715/234 |
| 2010/0332475 A1 | 12/2010 | Birdwell et al. | |
| 2011/0238649 A1* | 9/2011 | Jenkins et al. | 707/706 |
| 2012/0233238 A1* | 9/2012 | Braginsky | G06Q 30/0261 709/203 |
| 2013/0085861 A1* | 4/2013 | Dunlap | G01S 19/34 705/14.58 |

OTHER PUBLICATIONS

Russell et al, "Labeling, Discovering, and Detecting Objects in Images", Doctor of Philosophy in Electrical Engineering and Computer Science at the MIT, Feb. 2008, 137 pages.*
Russell et al, "Labeling, Discovering, and Detecting Objects in Images", Doctor of Philosophy in Electrical Engineering and Computer Science at the MIT, Feb. 2008. 138 pages.*
International Search Report and Written Opinion issued in corresponding International Application No. PCT/US14/17650 dated May 27, 2014.

* cited by examiner

*Primary Examiner* — Rehana Perveen
*Assistant Examiner* — Loc Tran
(74) *Attorney, Agent, or Firm* — Frommer Lawrence & Haug LLP; William S. Frommer (57) ABSTRACT

A method and system for organizing content data by adding one or more identifiers that place the content data in context or provide additional details about the content. The method includes attaching a label to image data and classifying the image data based on the label.

18 Claims, 8 Drawing Sheets

METHOD AND APPARATUS FOR CONTENT MANIPULATION

BACKGROUND

1. Field of the Invention

This invention relates generally to content data manipulation by placing the content in context. More particularly, the present invention relates to partitioning content based on identifying information related to the content as well as editing the content.

2. Background Discussion

Sharing electronic content has become a popular way for users of electronic devices to interact. Many social networking websites and services permit users to share content of interest. While social networking provides a forum to share electronic content, it would be an advancement in the art to provide an efficient and user-friendly system for a user to classify, organize, edit and share electronic content.

SUMMARY

Embodiments of the present invention involve a system and method to classify, share, edit and modify content data via a network.

Accordingly, one embodiment of the present invention is directed to a method and system for identifying particular parameters associated with accessed content, grouping at least a portion of the content based on the identified parameters and classifying the content based on the grouping.

Another embodiment is directed to an apparatus and method as mentioned, wherein the particular parameters are contextual objects of the content.

Yet another embodiment is directed to a method having particular application in accessing and classifying content in the form of images, wherein images are classified in accordance with particular parameters included therein, such as the settings of the imaging device, the contextual objects included in the images, the user of the device, and so on.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media. This electronic storage media may include, for example a non-transitory electronic storage medium/media such as a register, or other electronic repository or electronic storage location for data that is capable of storing data represented in electronic form, such as bits, bytes, kilobytes, waveforms, electronic signals, digital format and other data types, formats and forms of data.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Images and photography may be captured and reproduced. The increase of data memory capacity has enabled thousands of images to be captured by a user with a digital camera. Advances in photographic lens technology have enabled very high quality images to be captured.

Figure 1:
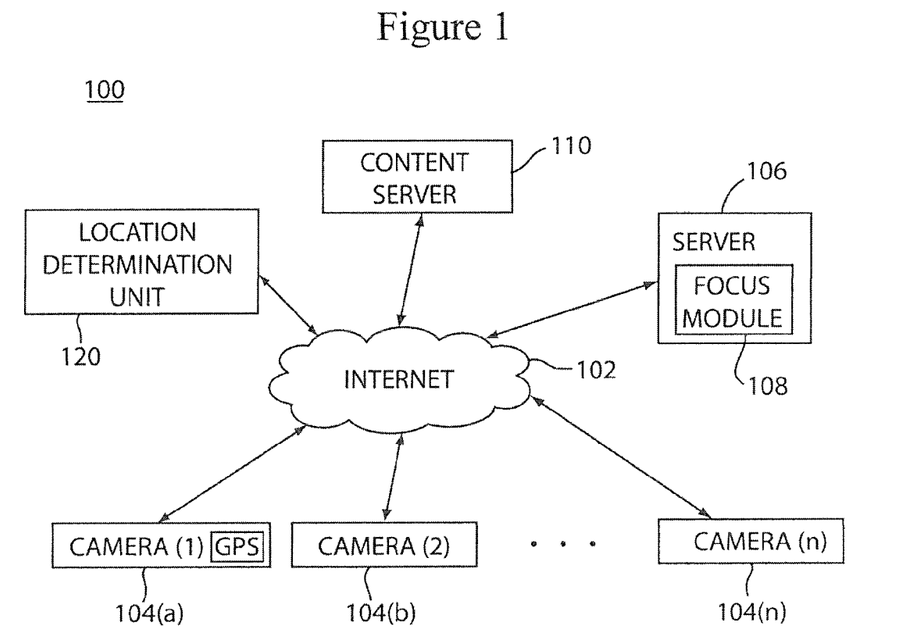
FIG. 1 shows a diagram of a network environment that supports embodiments of the present invention.

FIG. 1 illustrates an example of a system 100 that supports embodiments of the present invention. The system 100 shown in FIG. 1 includes a network 102, one or more electronic devices (cameras) 104(a), 104(b) . . . 104(n) (where "n" is any suitable number), a server module 106, a content server 110 and a location determination module 120.

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The electronic devices, modules, or facilities, or units (cameras) 104(a), 104(b) . . . 104(n) (where "n" is any suitable number), (generally referred to as 104, herein) typically have electronic data acquisition capability, such as obtaining, recording, reproducing and processing image data and/or audio data and/or a combination of image data and audio data. The cameras 104 may be, for example, network cameras that can receive and transmit data via a network (102). The camera devices may also be embodied as a Smartphone, IPTV (Internet Protocol Television) devices or other handheld device that can acquire and transmit image/audio data. The camera devices may include location identification units, such as typical GPS units incorporated into Smartphone devices. The cameras 104 may be electronic devices with processing capabilities and memory and output displays, such as, laptop computers, desktop computers, cell phone, personal digital assistant (PDA), wireless handheld device, and the like. The cameras 104 may be capable of processing and storing and displaying data themselves or merely capable of accessing processed and stored data from another location (i.e., both thin and fat terminals) and displaying the accessed or retrieved data. The camera devices 104 are in bi-directional communication with network 102 as shown by the associated arrows. The bi-directional communication may be, for example, a serial bus such as IEEE 1394, or other wire or wireless transmission medium. As an alternative, data obtained by a camera 104 (e.g. image data), can be transferred to a computer or other processing device, or to a card reader, which, in turn, communicates that data to the network.

The server module, or facility, or unit, 106 is typically one or more processors with associated memory, such as computers, or other processing devices such as a desktop computer, laptop computer, personal digital assistant (PDA), wireless handheld device, cellular telephone, or the like. The server module 106 is capable of processing and storing data or merely capable of accessing processed and stored data from another location (i.e., both thin and fat terminals). The server 106 includes electronic storage locations, such as RAM, ROM, EEPROM, registers and any suitable electronic storage medium that can store electronic data. The storage functionality of server 106 may be used to store algorithms, such as the algorithms described herein. Storage may be any suitable electronic storage, such as RAM, ROM, EEPROM, or other storage medium, or cloud-based storage using local or remote storage via a network, such as storage at a remote server.

The server module 106 includes a focus module 108. The focus module 108 is used to process and compare image data received from the camera devices 104. As an alternative, the focus module may be located in a camera device, or in a computer with which the camera device is in communication.

The server module 106 is in bi-directional communication with network 102 as shown by the arrow. The bi-directional communication may be, for example, a serial bus such as IEEE 1394, or other wire or wireless transmission medium.

The content server 110 is a facility, or unit, that typically includes one or more processors with associated memory, such as computers, or other processing devices such as a desktop computer, laptop computer, personal digital assistant (PDA), wireless handheld device, cellular telephone, or the like. The content server 110 is capable of processing and storing data or merely capable of accessing processed and stored data from another location (i.e., both thin and fat terminals). The content server 110 is used to store electronic content, such as audio data, image data and/or a combination thereof. The content server 110 may also access other storage databases, such as IMDB database. The content server 110 is in bi-directional communication with network 102 as shown by the associated arrow. The bi-directional communication may be, for example, a serial bus such as IEEE 1394, or other wire or wireless transmission medium.

The location determination module (or unit) 120 is used to identify the locations of camera devices 104. Module 120 is typically used to identify longitude and latitude coordinates of each camera 104 and may use the IP address of a respective camera to determine the camera's location. Other techniques may be implemented by module 120, such as triangulation of cell phone towers, wireless network signals detected by the camera, and the like. Module 120 can provide location data of each camera 104 to server 106. Server 106 can use the camera location data from module 120 or from the GPS unit in the camera to correlate a camera's proximity to an event. The GPS module 120 is in bi-directional communication with network 102 as shown by the associated arrow. The bi-directional communication may be, for example, a serial bus such as IEEE 1394, or other wire or wireless transmission medium. The cameras 104, server module 106, and content server 110 may be communication appliances, or user location devices, or subscriber devices.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

The camera devices 104 may be IPTV (Internet Protocol Television) devices, smart phones or other devices capable of obtaining image data, audio data or a combination thereof and processing or reproducing or transmitting the acquired electronic content. The camera devices 104 have memory and processing capabilities. Indeed, the devices 104 may also access one or more computer readable storage media such as RAM-based storage (e.g., a chip implementing dynamic random access memory (DRAM) or flash memory or disk-based-storage). Software code implementing present logic executable by the camera device 104 may also be stored on one of the memories of the camera device 104.

It is an embodiment of the present invention that the camera devices 104 are IPTV devices. An IPTV device can access a vast pool of content provided by numerous content providers. The IPTV device may also be used to control further distribution of content that has been provided by a third party to the IPTV device so that unauthorized access is prevented. Typically, IPTV is controlled by a single input device and has a single display device.

Figure 2:
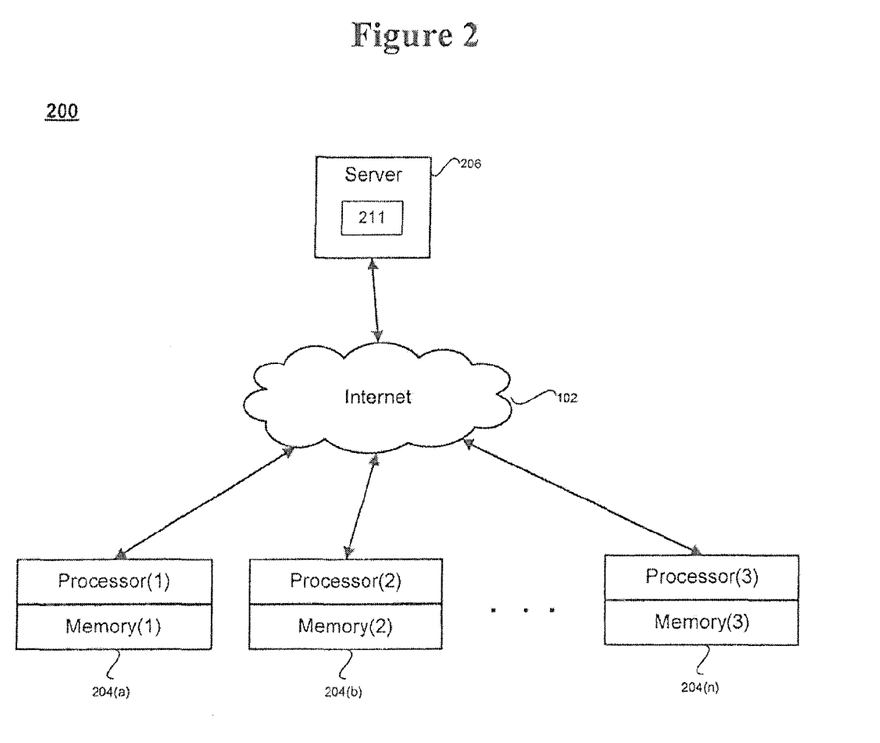
FIG. 2 shows a diagram of modules and a network according to another embodiment of the present invention.

FIG. 2 shows a system 200 that includes modules and a network according to another embodiment of the present invention. As shown in FIG. 2 the system 200 includes network 102 one or more electronic devices 204(*a*), 204(*b*) . . . 204(n) (where "n" is any suitable number) and a server module 206.

The network 102 is, similar to FIG. 1, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The electronic devices, modules, or facilities, or units 204(*a*), 204(*b*) . . . 204(n) (where "n" is any suitable number), (generally referred to as 204, herein) typically have electronic data acquisition capability, such as obtaining, recording, reproducing and processing image data and/or audio data and/or a combination of image data and audio data. The electronic device 204 may be, for example, network cameras that can receive and transmit data via a network (102). The electronic devices 204 may also be embodied as a Smartphone, IPTV (Internet Protocol Television) devices or other handheld devices that can acquire and transmit image/audio data. The electronic devices 204 include a processing module and a memory module. The electronic devices 204 may also include an output display. Examples of electronic devices 204 include laptop computers, desktop computers, cell phone, personal digital assistant (PDA), wireless handheld device, and the like.

The electronic devices 204 may be capable of processing and storing and displaying data themselves or merely capable of accessing processed and stored data from another location (i.e., both thin and fat terminals) and displaying the accessed or retrieved data. The electronic devices 204 are in bi-directional communication with network 102 as shown by the associated arrows. The bi-directional communication may be, for example, a serial bus such as IEEE 1394, or other wire or wireless transmission medium.

The server module, or facility, or unit, 206 is typically one or more processors with associated memory, such as computers, or other processing devices such as a desktop computer, laptop computer, personal digital assistant (PDA), wireless handheld device, cellular telephone, or the like. The server module 206 is capable of processing and storing data or merely capable of accessing processed and stored data from another location (i.e., both thin and fat terminals). The server 206 includes electronic storage locations, such as RAM, ROM, EEPROM, registers and any suitable electronic storage medium that can store electronic data. The storage functionality of server 206 may be used to store algorithms, such as the algorithms described herein. Storage may be any suitable electronic storage, such as RAM, ROM, EEPROM, or other storage medium, or cloud-based storage using local or remote storage via a network, such as storage at a remote server.

The server module 206 includes a directing module 211. The directing module 211 is used to store and execute program code to direct processing functionality for the electronic devices 204. For example, one electronic device 204(*a*) may acquire image data that requires processing. The electronic device 204(*a*) may not be able to process the data as efficiently as another electronic device (e.g., 204(*b*)) so the electronic device 204(*a*) may use directing module 211 to send data to electronic device 204(*b*) for processing. The processed data from device 204(*b*) would then be returned to device 204(*a*).

Figure 3:
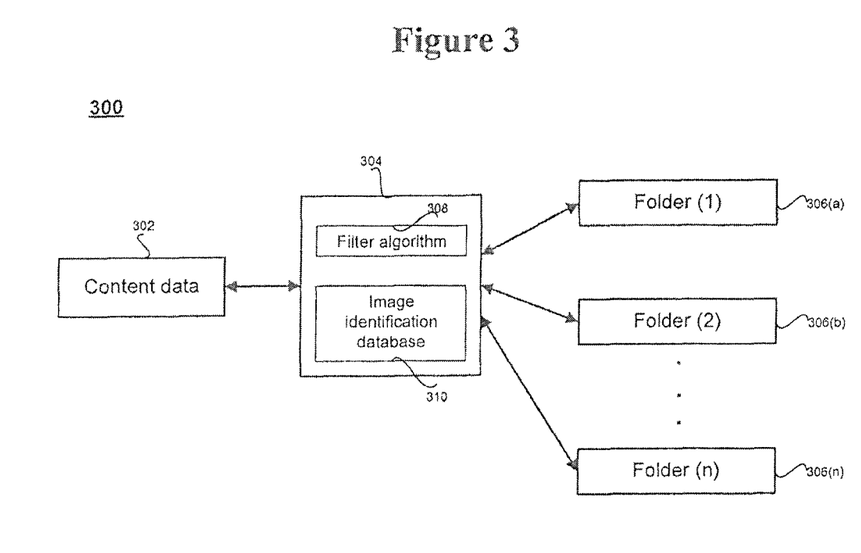
FIG. 3 shows a diagram of components of an embodiment of the present invention.

FIG. 3 illustrates a system 300 of components of an embodiment of the present invention. FIG. 3 shows a content data module 302, a filter module 304 and folder modules 306(*a*), 306(*b*) . . . 306(n) (where "n" is any suitable number), (generally referred to as 306, herein).

Content data module 302 is a storage facility or module or unit or electronic storage medium that stores electronic content, such as image data. Alternatively, the content module 302 may be a camera device (see FIG. 1, element 104, and FIG. 2, element 204) that obtains content data such as video, image data, pictures, and other electronic data. The content module 302 may retrieve or access the content and/or obtain the content from a live activity.

The content accessed, retrieved or obtained by content module 302 is provided to filtering module 304. The filtering module 304 includes filtering algorithm module 308 and identification database module 310. The filtering algorithm 308, as will be described herein, is used to classify the content into one or more folders 306. This filtering includes adding a label related to the context of the content to the content and classifying content based on the affixed label. The label may be based on contextual objects in the content. These contextual objects may be, for example, furniture in a photograph, such as a sofa and chair, which indicate that the image is taken indoors. Similarly, contextual objects such as trees and grass would indicate that the content data is an image taken outdoors. The filtering is used to extract these contextual objects from content and name, or label the content based on the contextual objects. The more contextual objects that are recognized, the more detailed the labeling may be. Furthermore, the filtering algorithm may also utilize user feedback to further label the content data.

For example, users may attach meta-data to content data, such as tags indicating the subject matter of the content, indications of people depicted in the content, or the rating of the content. Users may also sort content data into sets, folders, or other collections so that content that is assigned to the same collection (e.g. set or folder) can be considered to be related in some manner. The more collections (by the same or different users) two pieces of content have in common the stronger the correlation that can be drawn.

Meta-data associated with a set of content can be considered to apply to each piece of content in that set. Users may indirectly provide feedback through their interaction with content. If users commonly quit viewing a video shortly after starting it then it is a good sign that that content is not well liked. If users commonly select two pieces of content to view in close proximity to each other, there is likely a relationship between those two pieces of content Additionally, the filtering algorithm may convert the content data, which may be image data, into a 3-dimensional (3D) representation. The filtering may also include noise removal/reduction, sharpening separation of objects in the image and detecting object(s) edges.

The filtering algorithm 308 may also separate the objects in the image such that identification database module 310 may generate an associated label for the content.

The filtering algorithm 308 may feed the objects either individually and/or in batches into image identification database 310. The image identification database identifies the objects. The objects may be cross-referenced to a library of objects in an environment. For example, in a living room in the United States, these objects may be found: sofa; television/remote control; carpet; pillow; or picture frames. As a result, the image identification database 310 may add the label, or context, "living room" to the content. Thus, the image, or content, may be re-named "living_room_[DATE]" and labeled as "Home" sub-cluster.

Furthermore, when additional objects are identified in the content, which has been labeled as "living room", the content may be further identified. For example, when additional objects include contextual objects such as: Christmas tree; lighting; people wearing green and/or red, the resultant label may be "Christmas_living_room_[DATE]" and labeled as "Home-Christmas" sub-cluster.

Folders 306 are typically electronic storage locations, or storage modules that are used to organize, or classify content, into one or more folders, based on the filtering of filtering module 304. Each folder 306 may have additional sub-folders that may be used for finer granularity of the content based on the granularity of the label.

Figure 4:
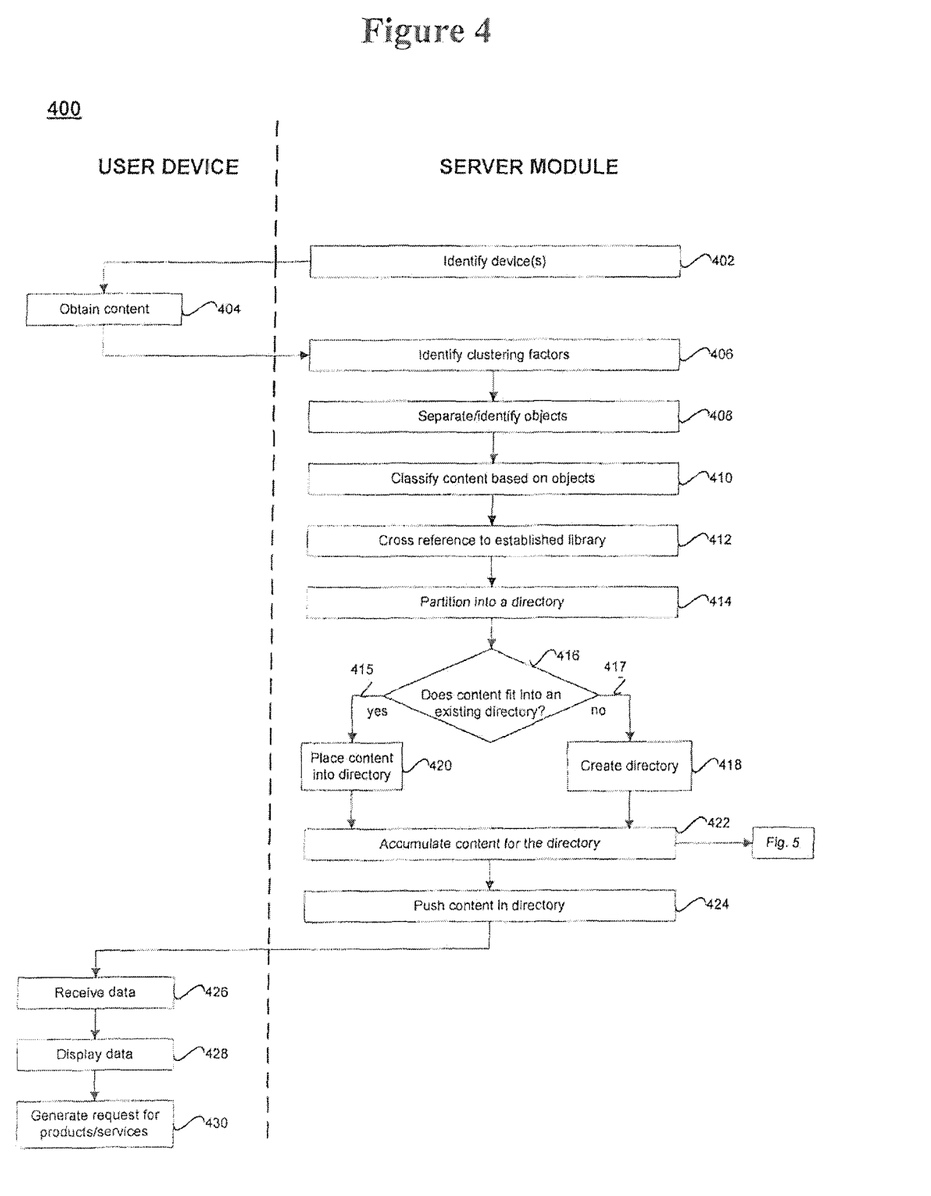
FIG. 4 shows a diagram of functionality of a user device and a server device to implement another embodiment of the present invention.

FIG. 4 is a functionality diagram 400 of the cooperation between of a user device and a server device to implement another embodiment of the present invention. As shown in FIG. 4, devices are identified, as shown in function block 402.

A user device, such as a camera, video recorder, smart phone with camera capabilities, or other image and/or content acquiring device obtains content, as shown by function block 404. The content may be image data, photography data, video data or other electronic or graphic representation. The content obtained by the user device is provided to a server module.

The server module identifies at 406, clustering factors, based on the received content. As shown in function block 408, contextual objects are identified and/or separated from the content data.

The content data is classified, based on the contextual objects, as shown in function block 410. The objects may be cross-referenced to a library of objects, which have been previously established, to determine any matches, as shown in function block 412.

The content data may then be partitioned into a directory based on the classification, as shown in function block 414.

A determination is made whether the content matches, or fits into an existing directory, as shown in function block 416. If the content matches an existing directory, "yes" line 415 shows that the content is placed in that directory, as shown by function block 420.

If the content does not match an existing directory, "no" line 417 shows that a new directory is created, as shown by function block 418. Thus, the matching function can recognize that some image data may be very similar and/or be obtained within a short period of time. For example, a person on a hiking trip may take multiple photographs of a landscape, or sunset. These photos may have substantially identical contextual objects and may be taken within a time period of five minutes. Thus, such images can be categorized, or classified, in a similar directory. Also, the image quality of these photos may also be compared.

Figure 5:
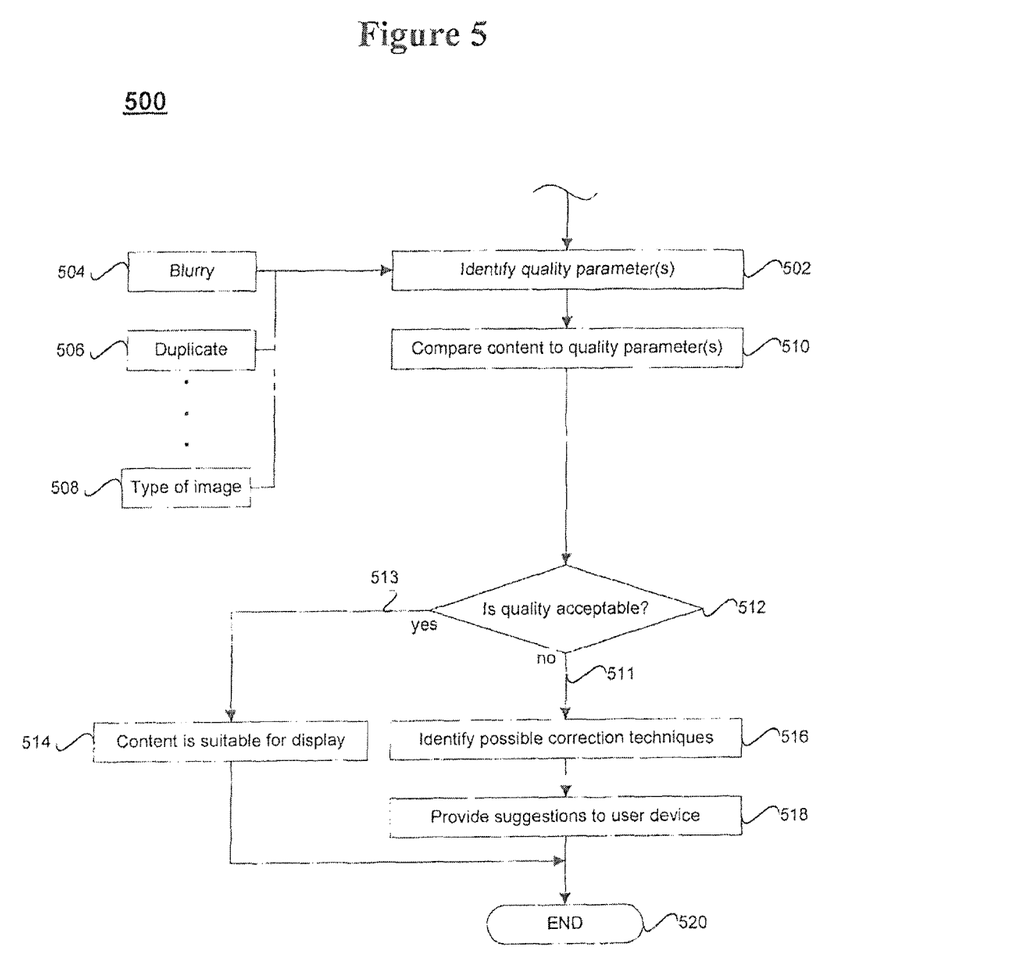
FIG. 5 shows a series of steps according to another embodiment of the present invention.

The content for each directory is accumulated as shown in function block 422. As stated above, the image quality of content that was taken in a close temporal relationship and has similar contextual objects may be compared for image quality. Suggestions for improving the quality of image data may be provided, as shown in FIG. 5 as described below.

The content in each directory may be provided (transmitted or "pushed") to one or more user devices, as shown by function block 424.

The user device(s) receive the data from the directory, as shown by function block 426.

The user device, which typically has a display screen or user interface, may display the received content, as shown by function block 428.

A user viewing the content may then request products and/or services based on the directory content being displayed, as shown by function block 430. For example, a user may view pictures of his (or her) house and request information regarding the purchase of new furniture because he is dissatisfied with his current household furniture when he sees a picture of his home interior.

FIG. 5 shows a series of steps 500 according to another embodiment of the present invention. The series of steps 500 may be stored as a program, or software, on a non-transitory computer readable medium or media (e.g., RAM, ROM, EEPRPOM, DRAM or other memory, electronic storage device or registry) and may be executed by a processor or plurality of processors. The storage medium may be resident on the user device or server module. The steps 500 are typically executed by a processor having adequate speed and processing capabilities. The execution may be at the client device and/or an associated server device. The steps 500 may be computer code or other program code (e.g., source code) that may be compiled into object code. The code, stored on a medium and/or accessed, is a module. The steps 500 may be stored on any one or more suitable modules described in relation to FIG. 1 and FIG. 2 herein.

The process 500 may be a subroutine that can be used in conjunction with the process 400 in FIG. 4 or may be executed as a stand-alone process. Also, the process 500 may be used with the modules shown in FIG. 2. The process 500 may be executed by a processor and begins with start step 502. As shown in step 502, one or more image quality parameters are identified. The image quality parameters may include, for example, blurry (504), duplicate (506) and type of image (508), such as landscape, sunset etc.

The content image is then compared to the quality parameters, as shown in step 510. A determination is made whether the image quality is acceptable, as shown in step 512. If not, "no" line 511 shows that possible correction techniques are identified, as shown in step 516.

The suggested correction techniques to correct the detected reason(s) for poor image quality may be provided to a user device, as shown in step 518.

When the image quality is acceptable (512), "yes" line 513 shows that the content is suitable for display at a user device, or other out module, as shown in step 514.

The process ends, as shown by end step 520.

Figure 6:
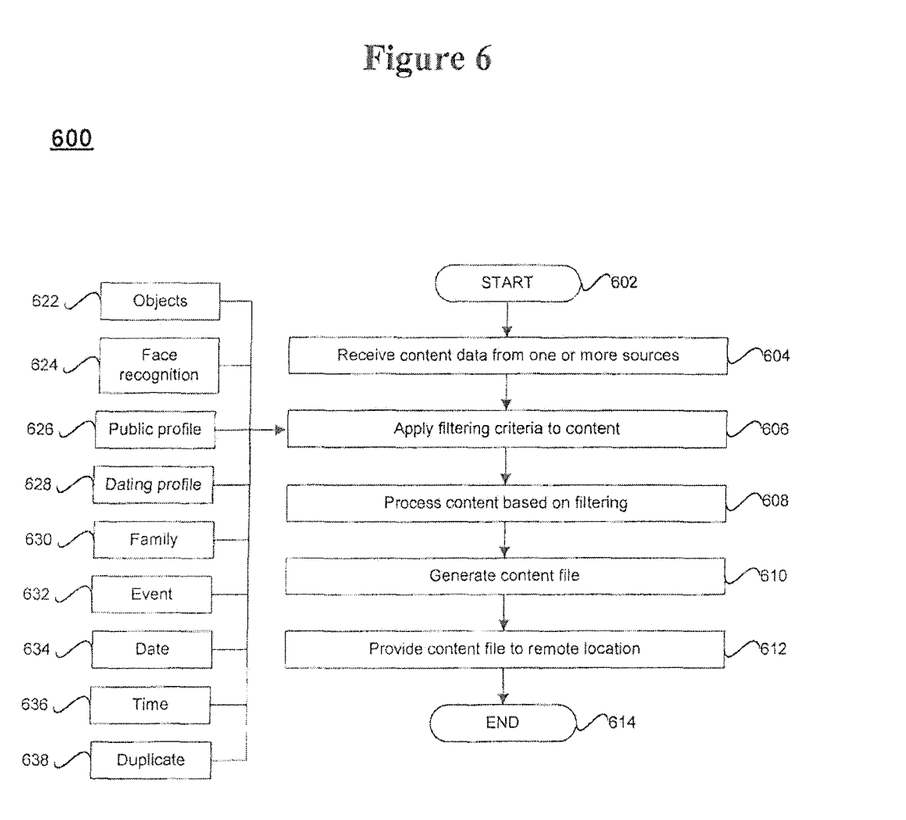
FIG. 6 shows a series of steps to provide content to a remote location according to another embodiment of the present invention.

FIG. 6 shows a series of steps 600 to provide content to a remote location, such as a user device, according to another embodiment of the present invention. The series of steps 600 may be stored as a program, or software, on a non-transitory computer readable medium or media (e.g., RAM, ROM, EEPRPOM, DRAM or other memory, electronic storage device or registry) and may be executed by a processor or plurality of processors. The storage medium may be resident on the user device or server module. The steps 600 are typically executed by a processor having adequate speed and processing capabilities. The execution may be at the client device and/or an associated server device. The steps 600 may be computer code or other program code (e.g., source code) that may be compiled into object code. The code, stored on a medium and/or accessed, is a module. The steps 600 may be stored on any one or more suitable modules described in relation to FIG. 1 and FIG. 2 herein.

The process 600 may be a subroutine that can be used in conjunction with the process 400 in FIG. 4 or may be executed as a stand-alone process. Also, the process 600 may be used with the modules shown in FIG. 2. The process 600 may be executed by a processor and begins with start step 602.

The server module, or other suitable processing module, receives content data from one or more sources, such as cameras, video recorders, camcorders or electronic storage locations, as shown in step 604.

The received content is then filtered, as shown in step 606. The filtering, which may be of the type performed by filtering module 304, may be used to identify contextual objects, such as furniture, trees, people and other indicators of a location or type of content (622). The filtering may also be based on face recognition (624), a user-defined public profile (628), a user-defined dating profile (628), members of a family (630), event data (632), date content was acquired (634), time content was acquired (636) and duplicate information (638).

The content is then processed based on the filtering, as shown in step 608. This processing may include using the filtering criteria to classify the content.

The processing/classification is used to generate one or more content files, as shown in step 610.

The content, as classified in a content file, or directory, or electronic folder, is provided to a remote location, such as a user device, output module, display device, or user interface, as shown in step 612.

The process 600 ends, as shown by end step 614.

Figure 7:
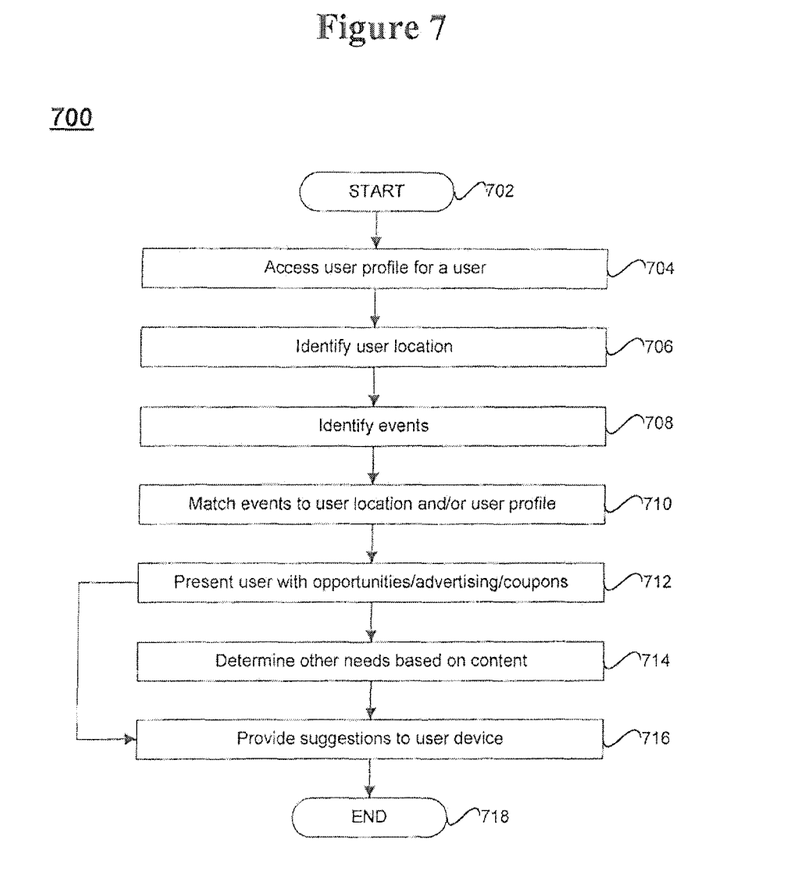
FIG. 7 shows a series of steps according to another embodiment of the present invention.

FIG. 7 shows a series of steps 700 according to another embodiment of the present invention. This algorithm may be used to provide suggestions to a user device regarding events that are occurring close to a user's location. The series of steps 700 may be stored as a program, or software, on a non-transitory computer readable medium or media (e.g., RAM, ROM, EEPRPOM, DRAM or other memory, electronic storage device or registry) and may be executed by a processor or plurality of processors. The storage medium may be resident on the user device or server module. The steps 700 are typically executed by a processor having adequate speed and processing capabilities. The execution may be at the client device and/or an associated server device. The steps 700 may be computer code or other program code (e.g., source code) that may be compiled into object code. The code, stored on a medium and/or accessed, is a module. The steps 700 may be stored on any one or more suitable modules described in relation to FIG. 1 and FIG. 2 herein.

The process 700 may be a subroutine that can be used in conjunction with the process 400 in FIG. 4 or may be executed as a stand-alone process. Also, the process 700 may be used with the modules shown in FIG. 2. The process 700 may be executed by a processor and begins with start step 702.

A user profile is accessed, as shown in step 704. This user profile is typically accessed at a server module and is based on user device information provided by the user device. The user profile data typically includes content that the user has previously obtained, which provides insight into the user's interests and activity preferences.

The location of the user device is identified, as shown in step 706. This may be accomplished by accessing GPS data and a device identifier. Alternatively, the server module may send an API (Application Protocol Interface) to determine the location of a user device.

Events, such as concerts, fairs, movies, promotional activities and other points of interest, are identified, as shown in step 708. This event location step may include, for example, identifying the location or venue of an event, such as a concert, play, fair, or other activity. The event location may be determined using longitude and latitude coordinates, GPS, print advertisement, web site notification, email blast, or other notification mechanism.

An event may also be identified through tags that appear on or are associated with content from a particular time and place that do not appear significantly for content in the same place at other times or at other places at the same time. For example if a particular band played at a particular theatre then tags with the band's name and tags such as concert are likely to be applied to content from many users that were produced at that theatre on that evening. Content from that theatre the next night will contain the name of that next night's act much more prominently as there is a different event at that theater at that next time.

The identified events and user locations are matched, as shown in step 710. Thus, available events, fairs, concerts and other activities are compared to content that the user has obtained and which has been classified.

The user, via the user device, may receive a notification regarding an event that is close in proximity to the current user location and matches the user's interests, as determined by the user's profile, which is based on the content the user has obtained, as shown in step 712. The notification may include details about the event, the types of events that are occurring, advertisements for the event as well as coupons, tickets, and/or other promotional information related to the event.

Other user needs, or possible interests may then be determined based on additional or other content, as shown in step 714.

Suggestions regarding events, attractions and other information may also be provided to the user device as shown in step 716. For example, if the user receives notification of an outdoor concert that is occurring a few blocks from his current location, the suggestion provided may be for a store that sells lawn chairs that is close to the outdoor concert.

The process 700 ends, as shown by end step 718.

Figure 8:
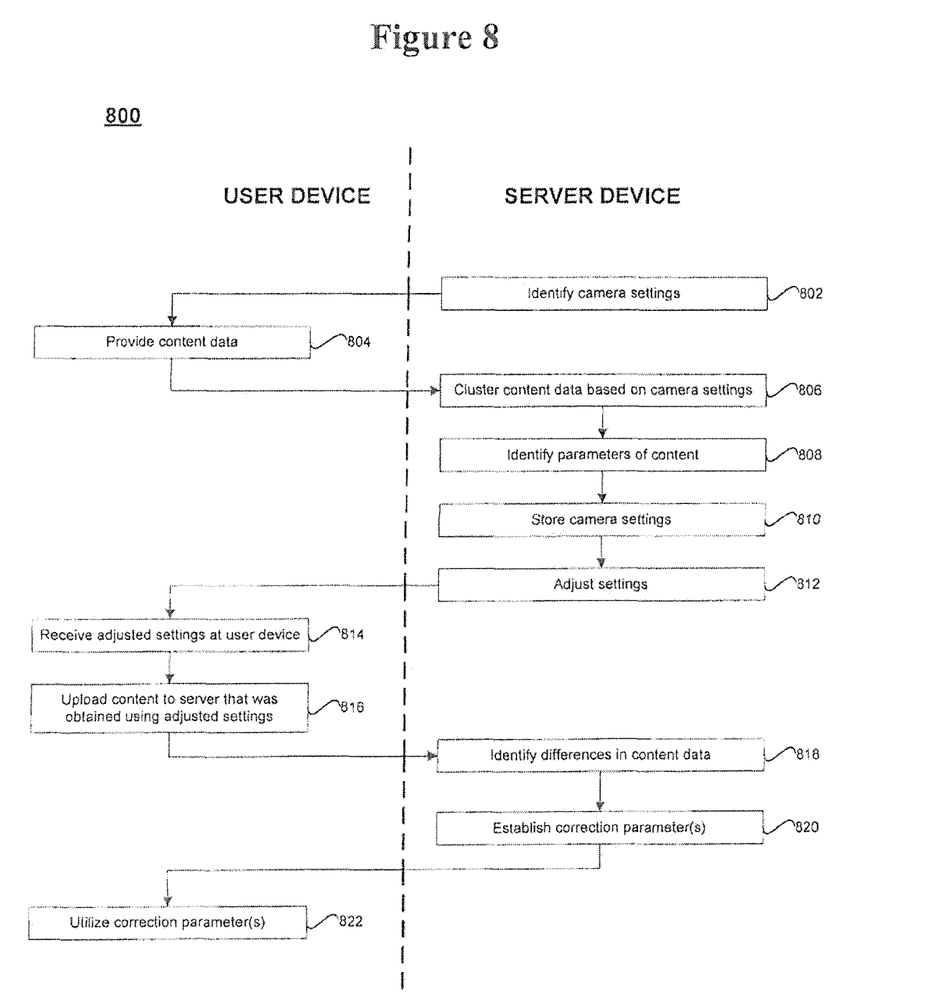
FIG. 8 shows a diagram of functionality of a user device and a server device to implement another embodiment of the present invention.

FIG. 8 is a functional diagram of process 800 of the interaction between a user device and a server device to implement another embodiment of the present invention.

Settings on a user device, such as a camera, video recorder, camcorder or other image obtaining device are identified, as shown in function block 802. These settings may be focus, zoom, landscape, portrait and other settings that may be user-set or set by the camera device.

Other settings include camera settings set by the user, such as the mode (program mode vs. night mode vs. sports mode . . . ) selected by the user to create the content. Such settings also include the camera settings set by the camera, such whether flash was used when the picture was taken, or the shutter speed to which the camera was set when the picture was taken. Many cameras give the user the option of enabling the camera to pick camera setting values automatically for many of the camera settings, so the same setting can be chosen by the user in one picture and chosen automatically by the camera in the next. Whether a setting was set by the user or the camera can be a factor in grouping content. For example if the user changes settings, then takes a series of images, then changes the settings and takes another series of images, the images taken with the different settings should be grouped together even if there are variations in those settings, such as shutter speed and aperture from one series of images to the next.

Content data, obtained from a user device, is obtained and sent to the server module, as shown by function block 804. This content may include video data, pictures, or any other electronic data representation that may be acquired and transmitted.

The content data is clustered, or filtered, based on the device settings that were identified, as shown in function block 806.

Parameters of the content are identified, as shown in function block 808. These include contextual objects as well as image quality parameters, such as focus, blur, contrast, jitter, and other aspects of image quality.

The user device (camera, camcorder, video recorder) settings are stored, as shown in function block 810.

Setting adjustments are determined, as shown in function block 812. These adjustments include, modifying the zoom, changing the focus and other camera settings.

The adjusted settings are sent to the user device, as shown by function block 814.

The user device then obtains additional content data using the adjusted device settings. This additional data is then transmitted, or uploaded to the server device, as shown by function block 816.

The server device, or module, compares the content data received prior to adjusting the user device settings to the content data received after the user device settings have been adjusted, as shown by function block 818. Differences in such content data are identified.

Correction parameter(s) are established based on the comparison, as shown by function block 820. These correction parameters are used to enhance the image quality of the content obtained by the user device.

The correction parameters are then transmitted to the user device, as shown by function block 822.

It will be appreciated from the above that the invention may be implemented as computer software, which may be supplied on a storage medium such as through a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for organizing content data comprising:
   inputting image content data;
   extracting from the image content data contextualized objects within the image, the contextualized objects being associated with respective ones of different environments of the image;
   identifying the extracted contextualized objects by identifying particular parameters associated with the extracted contextualized objects;
   referencing the extracted contextualized objects to a previously established library of objects in an environment to determine matches between the extracted contextualized objects and the objects in the environment library;
   labeling the image content data with an environment identifier associated with the environment library containing the matched object;
   establishing one or more categories for content, the categories being associated with groups of the contextualized objects;
   grouping the contextualized objects into groups based on the objects of the library to which the contextualized objects extracted from the image content data are matched; and
   classifying the image content data in a category based on the grouping of the matched contextualized objects extracted from that image content data.

2. The method as claimed in claim 1, wherein the grouping of the image content data comprises naming the image content data using the contextualized objects extracted from said image content data.

3. The method as claimed in claim 1, further comprising:
   accessing user feedback related to the classification of the image content data; and
   modifying the grouping step based on the user feedback.

4. The method as claimed in claim 1, further comprising:
clustering the image content data based on the classification step.

5. The method as claimed in claim 1, further comprising:
identifying time data associated with the image content data; and
clustering the image content data based on the time data.

6. The method as claimed in claim 1, wherein the contextual objects include facial features.

7. The method as claimed in claim 1, further comprising:
generating advertisement data based on the classifying step; and
providing the advertisement data to selected users.

8. The method as claimed in claim 1, further comprising:
providing the image content data to a user based on the classifying step.

9. The method as claimed in claim 8, further comprising:
utilizing social media to provide the image content data to the user.

10. The method as claimed in claim 1, further comprising:
determining whether the classification of particular content is appropriate for an existing grouping; and
establishing one or more additional clustering categories when the particular content is not appropriate for the existing grouping.

11. The method as claimed in claim 10, further comprising:
identifying content that is appropriate for the additional clustering groupings and/or the existing groupings.

12. The method as claimed in claim 1, further comprising:
filtering the image content data based on one or more filtering parameters to extract the contextualized objects and label the extracted contextualized objects corresponding to a set or folder.

13. The method as claimed in claim 12, wherein one filtering parameter is removal of duplicate content.

14. The method as claimed in claim 1, further comprising:
classifying the image content data into clusters based on one or more similar properties of the image content data.

15. The method as claimed in claim 14, further comprising:
identifying image quality of the image content data;
determining whether the image quality is unacceptable;
identifying one or more reasons for the unacceptable image quality of the image content data; and
generating a notification based on the one or more reasons.

16. The method as claimed in claim 15 further comprising:
generating a representation of the classified image content data; and
providing the representation to a remote location.

17. The method as claimed in claim 1, further comprising:
generating a user profile based on the classification of grouped image content data.

18. The method as claimed in claimed claim 17, further comprising:
providing the user profile to a remote location.

* * * * *